United States Patent [19]

Godfrey et al.

[11] 4,036,379

[45] July 19, 1977

[54] SECURING-UNLOADING APPARATUS FOR FLATCAR CARRIED WHEELED VEHICLES

[75] Inventors: William H. Godfrey, Aurora; Neal L. Woessner, Montgomery, both of Ill.

[73] Assignee: Caterpillar Tractor Co., Peoria, Ill.

[21] Appl. No.: 697,302

[22] Filed: June 17, 1976

[51] Int. Cl.² .................... B65G 65/00; B65D 3/16
[52] U.S. Cl. ................................ 214/152; 105/367; 105/474; 105/487
[58] Field of Search .............. 105/367, 368 R, 368 B, 105/368 S, 368 T, 466, 474, 475, 478, 479, 480, 484, 486, 488; 280/179 R, 179 A, 179 B; 214/152, 85; 248/354, 356; 296/35 A

[56] References Cited

U.S. PATENT DOCUMENTS 3,490,389   1/1970   Brown ........................... 105/368 B
3,866,773   2/1975   Koch ............................. 293/62 X

*Primary Examiner*—Albert J. Makay
*Attorney, Agent, or Firm*—Frank L. Hart

[57] ABSTRACT

Apparatus for securing and unloading wheeled vehicles. The apparatus has structure for receiving and maintaining first and second ends of the vehicle against movement on a flatcar. Portions of the structure maintaining the first end of the vehicle are pivotally movable for unloading the wheeled vehicle from the flatcar.

15 Claims, 7 Drawing Figures

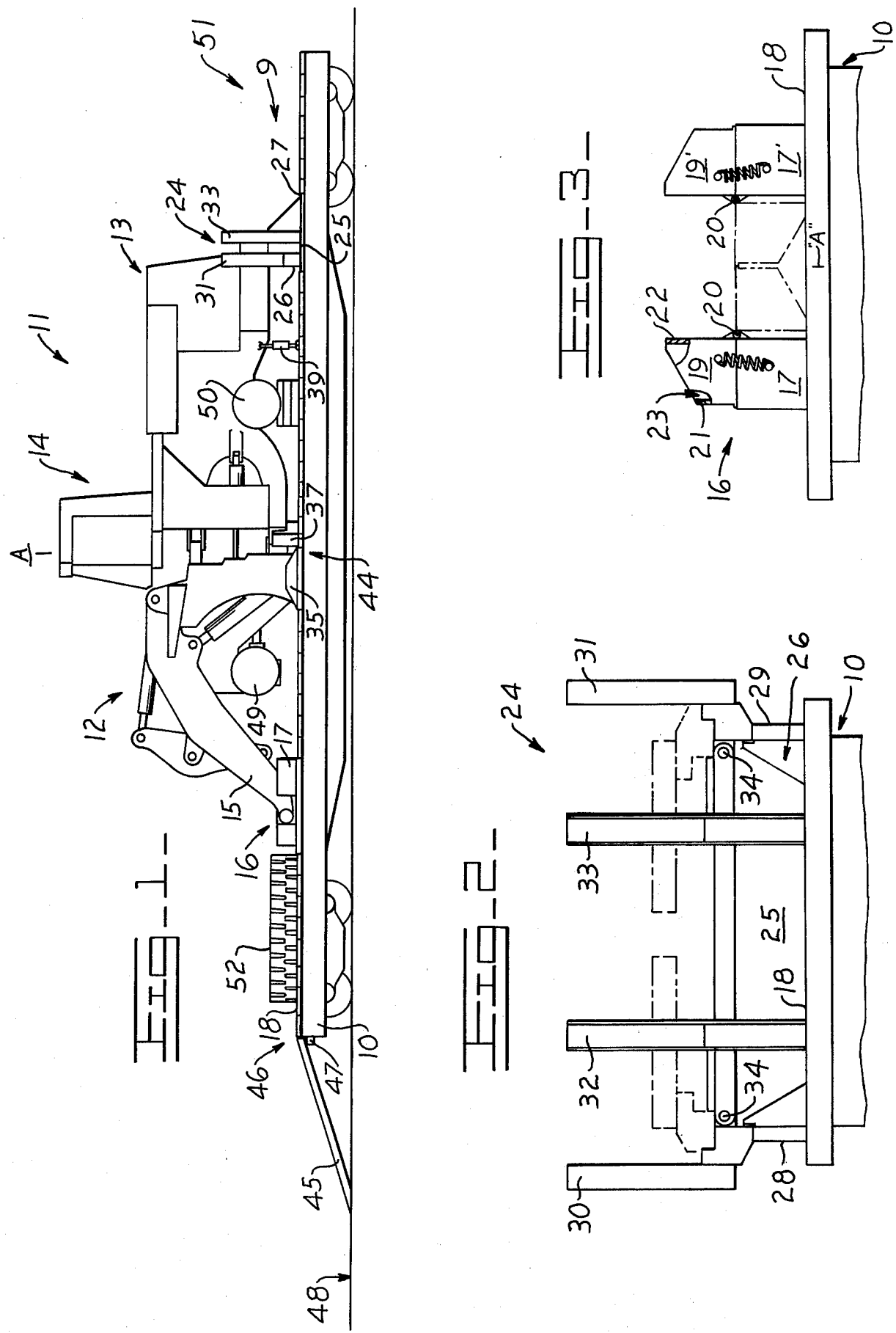

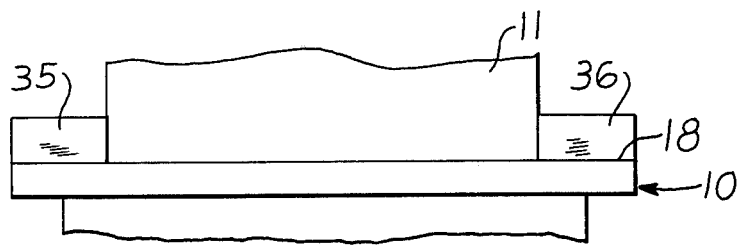
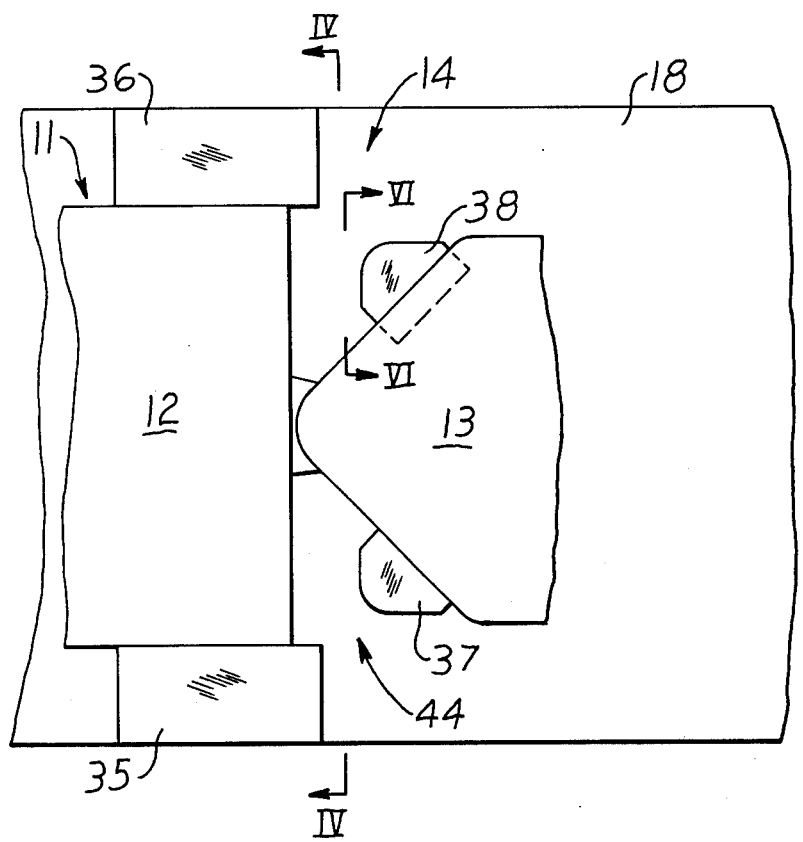
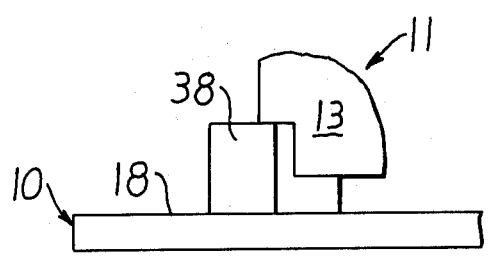
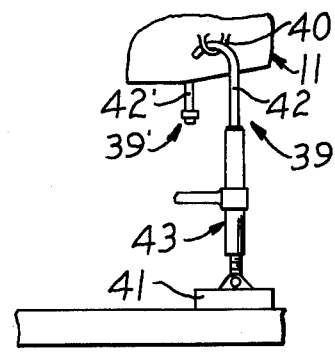

SECURING-UNLOADING APPARATUS FOR FLATCAR CARRIED WHEELED VEHICLES

BACKGROUND OF THE INVENTION

Shipping of large earthmoving vehicles is often difficult, owing to the heavy weight of the vehicle which necessitates considerable apparatus to prevent the vehicle from moving relative to its carrier. Most large size equipment is carried on flatcars and heretofore a large number of chains have been utilized to tie the vehicle securely to the flatcar. This arrangement has proven relatively unsatisfactory for several reasons. Often the chains and snubbing equipment are never returned to the sender and represent a considerable waste of equipment. The chains sometimes become loose or are loosened by vandals which can result in damage to the vehicle, the flatcar, or both. Also, a considerable waste in time and labor is realized in loading and unloading operations.

This invention solves these problems by providing securing apparatus which facilitates crane loading of the vehicle on the flatcar, tie down with a greatly reduced number of elements, and is an apparatus which has portions that are pivotally movable for unloading the vehicle from the flatcar.

BRIEF DESCRIPTION OF THE DRAWINGS

FIG. 1 is a diagrammatic side view of a flatcar having a wheeled vehicle secured thereon by the apparatus of this invention;

FIG. 2 is a diagrammatic view of the holding means of the apparatus as viewed from the second or right end portion of the vehicle;

FIG. 3 is a diagrammatic view of the lift arm means of the apparatus as viewed from the first or left end portion of the vehicle;

FIG. 4 is a diagrammatic view of the first pair of snubbing elements maintaining a middle portion of the vehicle;

FIG. 5 is a diagrammatic plan view of portions of the flatcar and vehicle showing the first and second pairs of snubbing elements;

FIG. 6 is a diagrammatic side view of one of the second snubbing elements; and

FIG. 7 is a diagrammatic view of the tensioning means connected to the flatcar and the vehicle.

DETAILED DESCRIPTION OF THE INVENTION

Referring to FIG. 1, a railway flatcar 10 is loaded with a wheeled earthmoving vehicle 11 such as a wheeled loader for example. The wheeled loader 11 is maintained on the flatcar by the securing-unloading apparatus of this invention.

The vehicle 11 has first and second end portions 12,13, a middle portion 14, and a movable lift arm 15 connected to the first end portion 12 of the vehicle 11.

Lift arm means 16 is connectable to the flatcar 10. The lift arm means 16 has a base 17 that is connected to the load carrying surface 18 of the flatcar 10 adjacent one end of said flatcar 10. An elongated supporting element 19 is connected to the base 17.

Referring to FIG. 3, the lift arm means 16 preferably has first and second bases 17,17′ each pivotally connected to respective first and second supporting elements 19,19′ by hinges 20. The supporting elements 19 or elements 19,19′ are pivotally movable between the first position, shown in FIG. 1 and by solid lines in FIG. 3, at which the supporting elements 19 are positioned above and supported by their associated base element 17 or elements 17,17′ for receiving the vehicle lift arm 15 and a second position, as shown by broken lines in FIG. 3, at which said supporting element 19 or elements 19,19′ are spaced from said first position and are at a location for unloading said vehicle 11 from said flatcar 10. Preferably, at their second positions, the supporting elements 19,19′ are adjacent and positioned between the spaced bases 17,17′. The supporting elements 19,19′ each have first and second spaced upstanding side members 21,22 for forming an elongated trough 23 extending substantially parallel with the longitudinal axis "A" of the flatcar 10. During unloading operation of the vehicle, as hereafter more fully described, the lift arm 15 is moved in the trough 23 in forcible contact with the supporting elements 19,19′. The side members 21,22 of each supporting element 19,19′ thereby form guide means for assuring that the lift arms 15 are maintained in contact with the supporting elements 19,19′ during movement of the lift arm 15. It should be understood that the base 17 supporting element 19 and lift arm 15 can each be a single element or a plurality of elements 17,17′, 19,19′. FIG. 3 shows plural elements to accomodate parallel arms 15 of the vehicle 11.

Referring to FIG. 1, a holding means 24 is connectable to the flatcar 10 for securing and maintaining the second end portion 13 of the vehicle 11 against lateral movement on the flatcar 10.

As better seen in FIG. 2, the holding means 24 has a base 25 that is connectable to an opposed end of the flatcar 10 spaced a preselected distance from the lift arm means 16 to accommodate the vehicle 11. The base 25 has a front 26, back 27 (FIG. 1), and first and second opposed sides 28,29 (FIG. 2).

A pair of side members 30,31 are each connected to a respective side 28,29 of the base 25 and extend upwardly a preselected distance therefrom. One or more rear members 32,33 are connected to the base 25 adjacent the back 27 of the base 25 and extend upwardly therefrom. The side and rear members 30-33 receive the second end portion 13 of the vehicle 11 in supporting relationship and maintain said vehicle portion 13 against lateral movement and movement toward the near or rear end 51 of the flatcar 10. It should be noticed that the front 26 of the base 25 is free from obstruction for crane lifting the vehicle into the flatcar 10 and moving the vehicle 11 toward the lift arm means 16 during unloading operations.

As shown by broken lines in FIG. 2, the side members 30,31 of the holding means 24 are pivotally connected to the base 25 by pins 34. The apparatus of this invention is therefore adapted to haul equipment of an oversized width and thereafter be easily and readily pivoted to a position which reduces the side overhang of the apparatus relative to the width of the flatcar 10.

The side members 30,31 are pivotally movable between a first position, shown by solid lines, at which the side members are laterally spaced from an associated side of the flatcar 10 and the apparatus is positioned for receiving and supporting a vehicle 11, and a second position, shown by broken lines, at which the side members 30,31 are extending inwardly generally toward one another and overlaying the base 25. The side members 30,31 can be locked in the first position by any means known in the art.

Referring to FIG. 1 and FIGS. 4–6, stabilizing means 44 are preferably provided to support and/or maintain the middle portion of the vehicle against movement relative to the flatcar 10. In the installed position of the vehicle 11 on a flatcar 10 having the apparatus of this invention, the first end portion 12 of the vehicle 11 is maintained against lateral movement by the lift arm 15 being positioned in the trough 23 and the second end portion 13 is maintained against movement in a direction toward the rear 51 of the flatcar 10 by the rear members 32,33 and against lateral movement by the side members 30,31. Where, however, the first and second end portions 12,13 of the vehicle 11 are pivotally connected together at the middle portion 14, it is preferable to maintain the pivotal connection against lateral movement. Further, means are desirable to assist in maintaining the vehicle against movement in a direction toward the lift arm means 16.

A first pair of stabilizing elements 35,36 are connected to the flatcar 10 at spaced locations and are of a construction sufficient for supporting the middle portion 14 of the vehicle therebetween and maintaining said vehicle middle portion 14 against lateral movement relative to the axis "A" of the flatcar 10. A second pair of stabilizing elements 37,38 can be connected to the flatcar 10 at spaced locations and can be of a construction sufficient for supporting the middle portion 14 of the vehicle 11 and maintaining the vehicle against movement in a direction toward the lift arm means 16.

These stabilizing elements 35,36,37,38 can be of various constructions responsive to the configuration of the vehicle 11 which is stabilized thereby. They should, however, be of a height and configuration that the vehicle 11 can pass over them and their removal is not required during unloading of the vehicle 11, as hereafter more fully described. When used with a wheeled loader, as set forth above, the second pair of stabilizing elements 37, 38 are preferably angularly oriented relative to the longitudinal axis "A" of the flatcar 10 and thereby are positioned for supporting the vehicle 11 against movements both along and laterally from the longitudinal axis "A". Elements 35,36 can also be of a height sufficient for driving over and thereby sufficiently lifting the vehicle for clearance.

Referring to FIGS. 1 and 7, actual fixing of the vehicle 11 to the flatcar 10 is provided by releasable tensioning means 39 that are preferably pivotally connected at one end to the flatcar 10 and releasably connected at the other end to a lift ring 40 of the vehicle 11. The tensioning means 39 is also of a construction sufficient for controllably connecting the vehicle 11 to the flatcar 10 with a preselected force.

The tensioning means 39 of the apparatus of this invention can be a single element 39 or a pair of elements 39,39' each of common construction and being connected to separate lift rings 40 that are positioned on opposed sides of the vehicle 11.

The tensioning means 39 can be of various construction without departing from this invention. In the preferred embodiment of FIG. 7, the tensioning means 39 has a base 41 connected to the flatcar 10, a hook 42 that is insertable in a lift ring 40 of the vehicle 11, and a threaded means 43 connecting the base 41 to the hook 42 and which is of an operable construction sufficient for controllably moving the hook 42 toward the base 41 for providing a preselected tensile force.

To assist in unloading the vehicle 11, a ramp means 45 can be carried on the flatcar 10 and releasably connected to a front end 46 of the flatcar 10 by channel 47, for example. The ramp means 45 is of a size sufficient for extending from the front end 46 of the flatcar to the ground 48 at a location spaced from the flatcar 10. That distance, as is known in the art, is dependent upon the length and under clearance of the vehicle expected to be unloaded.

In the operation of the apparatus of this invention, the vehicle 11 is crane lifted as a unit or one piece at a time and inserted into apparatus of this invention with the vehicle second end portion 13 forcibly urging against the holding means 24, and the stabilizing means 44 where utilized. The lift arm 15 is lowered into the trough 23 of the lift arm means 16 and the tensioning means 39,39' are connected and the vehicle 11 connected to the flatcar 10 by preselected tensile forces through the tensioning means 39,39'. At vehicle loaded condition, the resilient tires and bucket (not shown) of the vehicle are removed and can be securely stored on the flatcar 10 along with the ramp means 45, if included, and the lift arm means 16 and the side members 30,31 are at their first positions.

At the unloading site, the tensioning means are released and pivoted against the surface 18 of the flatcar 10, the vehicle is actuated to lower the lift arm 15 which functions to raise the front wheels 49 to a position at which the resilient front tires 52 can be installed thereon. The second end portion 13 of the vehicle 11 is then raised by jack means (not shown) for installing resilient tires on the rear wheels 50.

After installation of the resilient tires, the undercarriage of the vehicle has been raised to a greater height above the apparatus of this invention. The lift arm 15 is then raised clear of the lift arm means 16 and the supporting elements 19,19' are pivoted to their second position. The height of the lift arm means 16 has therefore been lowered to a height sufficient that the resilient tired vehicle 11 can be actuated and driven over the stabilizing means 44 and lift arm means 16, down the ramp means 45 and onto the ground.

By so constructing the apparatus of this invention, there is a considerable saving of loading and unloading time and labor, substantially all of the securing apparatus is securely maintained with the flatcar 10 and readily available for repeated use, and the vehicle is more efficiently maintained on the flatcar 10.

Other aspects, objects, and advantages of this invention can be obtained from a study of the drawings, the disclosure, and the appended claims.

What is claimed is:

1. A railway flatcar securing-unloading apparatus for a wheeled vehicle having first and second end portions, a middle portion, and a movable lift arm connected to the first end portion, comprising:

lift arm means connectable to a flatcar and having portions pivotally movable between a first position for receiving and movably maintaining the vehicle lift arm on the flatcar and a second position at which said pivotal portions are spread from said first position for unloading said wheeled vehicle from said flatcar, said lift arm means comprising a base connectable to the flatcar and an elongated supporting element pivotally connectable to the base and positionable upon the base at the first position and adjacent the base at the second position;

holding means connectable to the flatcar for receiving and maintaining the second end portion of the wheeled vehicle against lateral movement on the flatcar; and tensioning means for releasably connecting the vehicle to the flatcar with a preselected force.

2. Apparatus, as set forth in claim 1, including stabilizing means connectable to a middle portion of the wheeled vehicle and being in contact with the flatcar for maintaining said vehicle middle portion against movement relative to the flatcar.

3. Apparatus, as set forth in claim 1, including ramp means connectable to an end of the flatcar and being of a size sufficient for extending from the end of the flatcar to the ground at a location spaced from the flatcar end for providing an unloading ramp for moving the wheeled vehicle from the flatcar to the ground.

4. Apparatus, as set forth in claim 1, wherein there are first and second spaced apart bases and associated first and second supporting elements.

5. Apparatus, as set forth in claim 4, wherein the first and second supporting elements are positioned between the first and second bases at the second position of said supporting elements.

6. Apparatus, as set forth in claim 4, wherein the first and second supporting elements each have first and second spaced side members forming an elongated trough extending generally parallel with the longitudinal axis of the flatcar.

7. Apparatus, as set forth in claim 1, wherein the holding means comprises:
 a base having a front, a back, and opposed sides connectable to the flatcar;
 a side member connected to each side of the base and extending upwardly therefrom;
 a rear member connected to the base and extending upwardly therefrom for supporting the second end portion of the vehicle on the base between the side members and adjacent the rear member.

8. Apparatus, as set forth in claim 7, wherein the side members of the holding means are pivotally connected to the base for movement between a first position at which the side members extend upwardly from the base and a second position at which the side members are extending generally toward one another and overlying the base.

9. Apparatus, as set forth in claim 8, wherein the side members, at the first position, are each laterally spaced from an associated side of the flatcar.

10. Apparatus, as set forth in claim 7, wherein the rear member comprises at least two spaced apart upright members each extending upwardly from the base.

11. Apparatus, as set forth in claim 1, wherein the first and second end portions of the vehicle are pivotally connected one to the other at the middle portion of the vehicle and including:

a first pair of stabilizing elements connectable to the flatcar at spaced locations and being of a construction for supporting the middle portion of the vehicle therebetween and maintaining said vehicle against lateral movement; and
 a second pair of stabilizing elements connectable to the flatcar at spaced locations and being of a construction for supporting the middle portion of the vehicle and maintaining the vehicle against movement in a direction toward the lift arm means.

12. Apparatus, as set forth in claim 11, wherein the second pair of stabilizing elements are angularly oriented relative to the longitudinal axis of the flatcar for supporting the vehicle against movements along and laterally from said longitudinal axis.

13. Apparatus, as set forth in claim 1, wherein the second end portion of the vehicle has a lift ring connected thereto and the tensioning means comprises:
 a base connectable to the flatcar;
 a hook insertable in the vehicle lift ring; and
 threaded means for connecting the base to the hook and being operable for controllably moving the hook toward the base for connecting the vehicle to the flatcar with a preselected tension.

14. Apparatus, as set forth in claim 13, wherein there are a plurality of spaced apart tensioning means each of common configuration.

15. A method for loading, securing, and unloading a wheeled vehicle having a movable lift arm and front and rear wheels on a flatcar having a lift arm means having a pivotally movable supporting element, a holding means, and a tensioning means, comprising:
 positioning the wheeled vehicle on the flatcar with the lift arm in contact with the supporting element and the opposed end of the vehicle in contact with the holding means;
 connecting the vehicle to the flatcar with a preselected force by a tensioning means;
 thereafter releasing the tensioning means;
 raising the front wheels in response to lowering the vehicle lift arm in forcible contact with the supporting element;
 installing resilient tires on the front wheels of the vehicle;
 raising the vehicle lift arm free from contact with the supporting element and supporting the vehicle on the resilient front tires;
 pivoting the supporting element to a preselected lower elevation;
 raising the rear of the vehicle;
 installing resilient tires on the rear wheels of the vehicle; and
 driving the vehicle over the lift arm means and from the flatcar.

* * * * *